(12) United States Patent
Pankaj

(10) Patent No.: US 11,466,918 B2
(45) Date of Patent: Oct. 11, 2022

(54) COLD STORAGE CONTAINER, COLD STORAGE CONTAINER MANAGEMENT SYSTEM, AND COLD STORAGE PROGRAM

(71) Applicant: INNOVATION THRU ENERGY CO LTD., Tokyo (JP)

(72) Inventor: Garg Pankaj, Tokyo (JP)

(73) Assignee: INNOVATION THRU ENERGY CO LTD., Tokyo (JP)

( * ) Notice: Subject to any disclaimer, the term of this patent is extended or adjusted under 35 U.S.C. 154(b) by 498 days.

(21) Appl. No.: 16/325,841

(22) PCT Filed: Nov. 22, 2016

(86) PCT No.: PCT/JP2016/084658
§ 371 (c)(1),
(2) Date: Feb. 15, 2019

(87) PCT Pub. No.: WO2018/096598
PCT Pub. Date: May 31, 2018

(65) Prior Publication Data
US 2021/0293464 A1    Sep. 23, 2021

(51) Int. Cl.
| F25D 3/00 | (2006.01) |
| F25D 11/00 | (2006.01) |
| F25D 16/00 | (2006.01) |
| B60P 3/20 | (2006.01) |

(52) U.S. Cl.
CPC .............. *F25D 3/00* (2013.01); *F25D 11/00* (2013.01); *F25D 16/00* (2013.01); *B60P 3/20* (2013.01)

(58) Field of Classification Search
CPC . F25D 3/00; F25D 16/00; F25D 11/00; B60P 3/20
See application file for complete search history.

(56) References Cited

U.S. PATENT DOCUMENTS 4,951,479 A * 8/1990 Araquistain ......... B60H 1/3235
105/355

FOREIGN PATENT DOCUMENTS

| CN | 1773198 A | 5/2006 |
| JP | 2000-241056 A | 9/2000 |
| JP | 2003-254650 A | 9/2003 |
| JP | 2009-525450 A | 7/2009 |
| JP | 3169058 U | 7/2011 |
| JP | 3174910 U | 4/2012 |
| JP | 2013-249125 A | 12/2013 |
| JP | 2015-17796 A | 1/2015 |
| JP | 2015-180844 A | 10/2015 |
| JP | 2016-80244 A | 5/2016 |
| WO | 2016/120927 A1 | 8/2016 |

* cited by examiner

*Primary Examiner* — Ana M Vazquez

(57) ABSTRACT

The present application is directed to cooling containers that rely on refrigerants. The cooling container is able to efficiently keep items cool by adjusting the input and output of cool air inside the cooling container. For example, storage area no. 1 can keep the refrigerants used for keeping insulated items cool. Plank 1 is parallel to the storage area 1. Plank 2 is parallel to plank 1 and storage area no. 2 storing insulated items therein. The planks 1 and 2 are perpendicularly placed above and below a horizontal plane. Planks 1 and 2 can be adjusted to be higher or lower, so as to adjust the distance therebetween. This allows more efficient control of the airflow of the cool air before the air goes into storage area 2.

12 Claims, 10 Drawing Sheets

COLD STORAGE CONTAINER, COLD STORAGE CONTAINER MANAGEMENT SYSTEM, AND COLD STORAGE PROGRAM

CROSS-REFERENCE TO RELATED APPLICATIONS

This application is a National Stage of International patent application no. PCT/JP2016/084658, filed on Nov. 22, 2016, the disclosure of which is incorporated by reference in its entirety.

FIELD OF THE INVENTION

This invention is relevant to refrigerating containers, refrigerating container management systems and cooling programs for keeping insulated objects cool.

BACKGROUND

Cooling containers are usually known to be equipped with a cooling material, so as to keep items that require refrigeration or cold storage (hereinafter referred to as "insulation items") inside. If a cooling container includes insulating material, even in a location with no refrigerator or freezer, it is possible to keep insulation items cool by preparing ahead of time and either refrigerating or freezing the container itself.

Thus, even in the logistics business, vehicles that are not equipped with a refrigerator or freezer are able to transport items while keeping them cold. This allows vehicles to no longer require compressor-type refrigerators or freezers, lowering distribution costs and reducing carbon dioxide emissions.

In patent document 1, an example of the technology relevant to cold insulation in cooling containers is listed.

In the techniques disclosed in the patent document 1, the container is designed with a mounting component, where a cooling device with refrigerants can be installed inside of the container. Furthermore, in the mounting component inside of the container, refrigerants such as dry ice could be placed inside of the refrigerant-holding container. In additional, the container can be placed on top of a pallet, then moved by a forklift and be loaded on a vehicle. In this way, it is possible to transport items while keeping them cool.

In another instance, with regards to distribution stations throughout distribution routes, by switching out the inside of the refrigerant-holding container with newer dry ice, it is possible to keep materials insulated even throughout subsequent movements before cool items reach the final destination.

PATENT DOCUMENT

[Patent Document 1]
Official patent no. 2013-249125

SUMMARY OF THE INVENTION

As the text above describes, by utilizing the techniques disclosed in the patent document 1, it is possible to transport insulated items while keeping it cold with refrigerants.

However, relying on the technique disclosed in patent document 1 also required preparation of refrigerants such as dry ice in advance, for during the transportation of distribution items.

On top of that, in order to restock the refrigerants inside, it was necessary to take out the insulated items out of the container once. Then, after the new refrigerants were restocked inside of the container, the insulated items would be placed back inside of the container again.

In this respect, it is possible to use refrigerants that are not dry ice, but a reusable refrigerant that could be cooled and used over and over. But in order to reuse such a refrigerant, it was no different from replenishing dry ice in that ultimately extra steps are involved, such as taking out the cooling agents/insulation items from the container and putting them back in. It was also difficult to adjust the inside of the container to the desired temperature upon restocking the refrigerant.

This means that according to the conventional technology disclosed in the techniques of patent document 1, it is difficult to conveniently utilize cooling containers that require refrigerants.

That is why the goal of this invention is to provide a cooling container, cooling container management system and cooling program that will allow easy usage of cooling containers with refrigerants.

According to aspect no. 1 of this invention, between storage space 1, for refrigerants that keep the insulated items cool, and plank 2 that separates storage spaces 1 and 2, plank 1 is placed horizontally to plank 2 within the storage space 1. Thus, in between plank 1 and storage space 2, there is another parallel plank 2. In storage space 2, there are also refrigerants stored, whereinafter planks are placed from above or from below, in perpendicular and alternating fashion. When planks 1 and 2 as described are raised or lowered (sometimes just one, sometimes both), and by adjusting planks 1 and 2's distance from the horizontal plane, the air that flows from the refrigerant through storage space 2 can also be adjusted. This cooling agent provides the means of controlling the airflow of the cold air inside.

Aspect no. 2 of this invention is meant to be a cooling container management system, that allows communication between the cooling container from aspect no. 1—as listed above—and the management systems. The cooling system listed can detect the cooling container's current location, as well as the temperatures of the storage spaces of aspects no. 1 and no. 2—as previously mentioned. This information is all sent to the management system, so that the management system can relay this information to a user about the cooling container.

Between the refrigerant storage space 1 and storage space 2 there is plank 2 that is parallel to the horizontal plane. Between plank 2 and plank storage space 1 there is another plank, plank 1. Perpendicular to the two planes are planks that are placed from above or below, in alternating fashion. In accordance to aspect no. 3, the cooling container is provided with a computer that has a cooling program within, which can raise or lower the planks between planks 1 and 2, as well as adjust the distances from planks 1 and 2. This allows the refrigerant to work more effectively in providing control over the airflow before flowing into storage space 2.

Given this invention, easier usage of cooling containers with refrigerants is possible.

DETAILED DESCRIPTION

The following text will explain the three different implementations of this invention, in implementation 1, implementation 2, and implementation 3. First, readers will read a brief summary of each of these implementations. Each of these implementations are placed with the goal of making cooling containers that rely on refrigerants easier to use.

Implementation 1 of this invention is a cooling system that includes a unique cooling container and a cooling device connected to the cooling container. Implementation 1 holds at least 3 unique characteristics.

First of all, in implementation 1, the cooling container has a fan that introduces cool air, provided by the cooling system, to the refrigerant's storage space. There is also another fan that creates an output for the air inside of the storage space, returning this air to the cooling system. This allows the cool air provided by the cooling system to circulate, making the refrigerant more effective at cooling.

Next, in implementation 1, 2 drain pans are included in the cooling container. These two drain pans are strategically placed, in order for the refrigerant to more efficiently work. Based on the shapes of these two drain pans, it is also possible to prevent water from dropping over the insulation items in the cooling container.

Lastly, in implementation 1, the temperatures of the refrigerants as well as the cooling container can be measured. Based on these measurements, the cooling device and drain pans can be controlled. Thus, the cooling device and drain pans are used efficiently.

The above is a summary of implementation 1.

In addition, implementation 2 includes the cooling container management system, which oversees the unique cooling container, the managing server that manages the cooling container, and the vehicle which transports the cooling container itself.

While transporting the cooling container in a vehicle, the implementation 2 is able to acquire information from the management server about the cooling container. The management server is able to acquire information from the management server, so that management of the cooling container can be adjusted. For instance, a user is able to know the situation of a cooling container. Or, users are able to make payments for using fees, based on the user's usage history.

The above is a summary of implementation 2.

With implementation 3, by leading the cool air that the cooling device provides into the refrigerant's storage space, this is different from implementation 1. This requires multiple fans to guide the cool air. Thus, each of the refrigerants are used equally, and shortens the freezing time of the refrigerants. That is the summary of each of the implementations in this invention.

Next is a detailed description of the invention's implementations, using the figures as a reference.

<Implementation 1>

Figure 1:
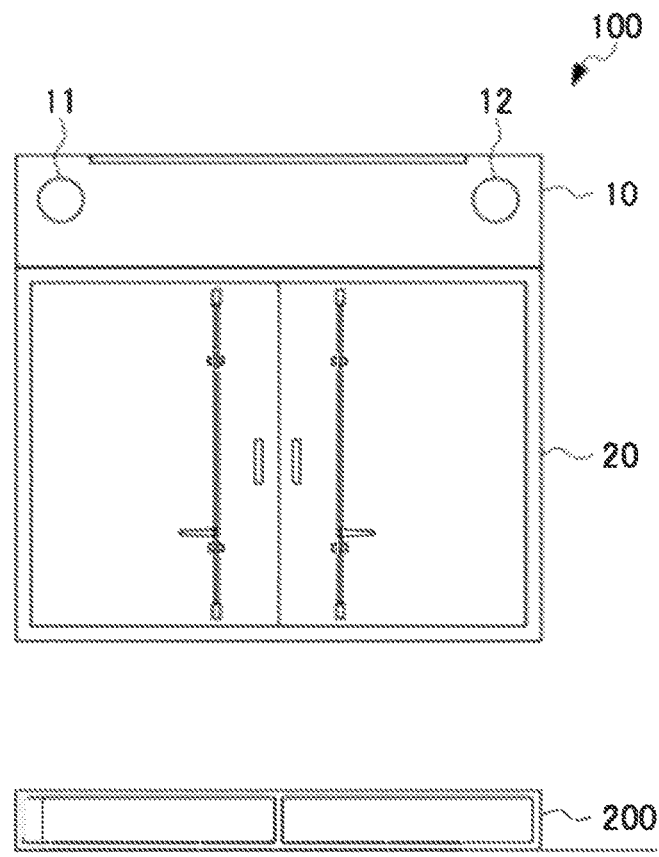
FIG. 1 illustrates a front view of the container, in the invention's first implementation.

FIG. 1 is a front view of the outside of the container 100 and pallet 200, with regards to this implementation.

Container 100 is made up of refrigerant 30, filled with refrigerants, as well as insulating material, making it a cooling container that can keep insulated items cool. Pallet 200 is a pallet used for transporting container 100, by placing container 100 on top. Further, as FIG. 1 shows, container 100 includes the refrigerant containing area 10 and insulating items container 20. [0017]

The refrigerant storage space 10 accommodates as a space for refrigerant storage space 30. Further, refrigerant storage space 10 is also provided with a fan on the inside that can circulate the cooling air supplied by the refrigerating device 300. Refrigerant storage space 30 also has a suction connector 11 on the left side facing front, and an ejecting connector 12 on the right side facing front. Suction connector 11 and ejecting connector 12 are connectors for the pipes that come with refrigerating device 300. To be exact, suction connector 11 is a connector for the pipe that absorbs cool air cooled down to −60° C., etc., from refrigerating device 300. Ejecting connector 12 on the other hand, is meant to connect the pipe that ejects the cool air after the air has effectively cooled the refrigerant 30.

Meanwhile, storage space 20 is a space where insulating items are stored. The insulating items storage space 20, is built using insulating materials into a hollow cuboid.

The insulating materials would, for example, contain materials such as foamed resin, etc. By designing the storage space 20 with insulating materials, it is possible to make it more difficult for outside heat to be transferred inside of the storage space 20. This makes it possible for insulating items stored in storage space 20 to be securely refrigerated.

In addition, the insulating item storage space 20 has double doors in the front. Users are able to open and close these doors to store insulating items in storage space 20, or remove the items. Examples of items that can be kept in storage space 20 are as such: ice, ice cream, frozen food products, chilled food products, fresh produce, chemicals, etc.

Pallet 200 is designed with a hole that the fork of the forklift can be placed inside. When container 100 is placed on top of pallet 200, the fork can be hooked inside of the hole, which allows the container 100 to be removed with the pallet 200. Pallet 200 is shaped on the top and bottom surfaces to fit container 100 in between, where a shape that is the same shape and size as the bottom of container 100 has been designed.

Figure 2:
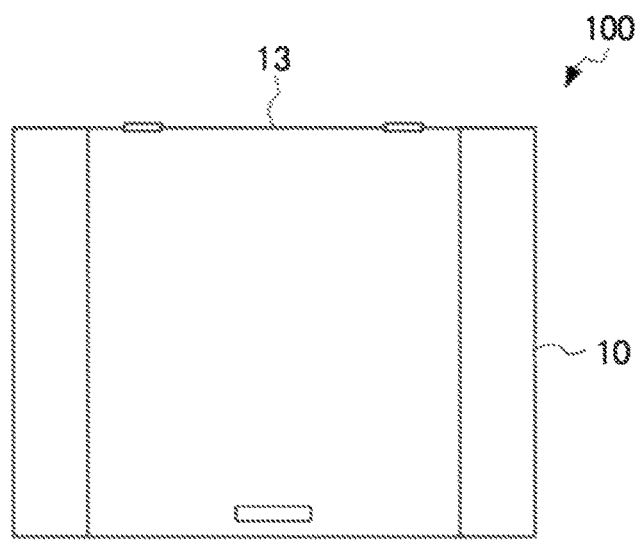
FIG. 2 illustrates a plan view of the container, in the invention's first implementation.

The following text requires FIG. 2 to understand, which is a plane figure of container 100. As FIG. 2 shows, in the center area of the refrigerant storage space 10's surface, the opening and closing compartment 13 is placed. The opening and closing surface 13 is designed to be a lid-like compartment, made up of an insulating plate and attached to storage space 10 via a hinge. Users are able to open the refrigerant storage space 10, allowing access to the storage space for refrigerant 30. To be exact, by opening the storage space 10, it is possible to place refrigerant 30 inside storage space 10, or take out refrigerant 30 from inside storage space 10. Furthermore, by closing the storage space after placing refrigerant 30 inside, it is possible to seal refrigerant 30 hermetically. This prevents the cool air produced inside storage space 10 via refrigerant 30 to leak to the outside.

Figure 3:
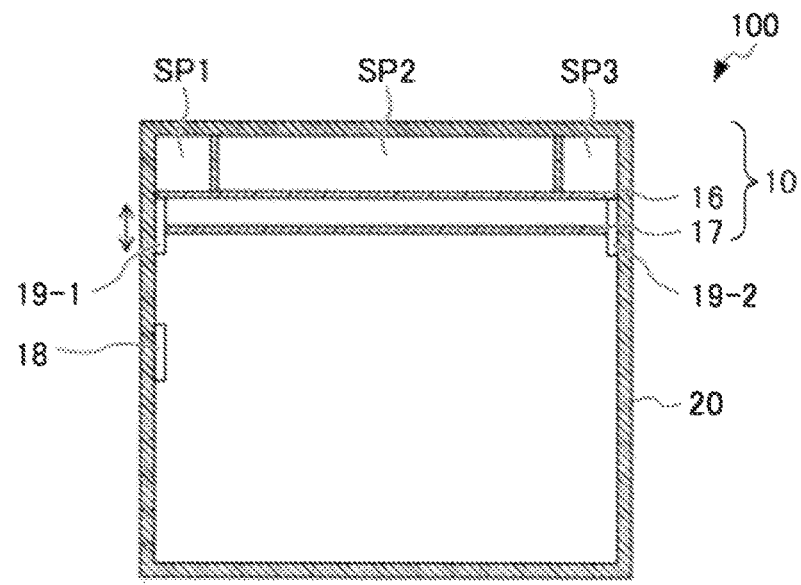
FIG. 3 illustrates a cross-sectional view of the container, in the invention's first implementation.

Next, in order to understand the following text that described the inner design of container 100, refer to FIG. 3 that is a cross-sectional view of container 100.

As previously mentioned, the bottom plate and side plates of container 100, or the surrounding compartments of container 100 are insulated materials cut to the desired thickness.

Furthermore, the refrigerant storage space 10 is separated into 3 different spaces, divided by 3 perpendicularly placed insulated planks (as seen in the figure, this refers to SP1, SP2 and SP3; spaces 1, 2 and 3 respectively).

As the figure shows, space 2—SP2—is the area where refrigerant 30 can be stored, as a chamber that refrigerant 30 cools. SP1 is therefore the space that absorbs the cool air provided by the cooling device 300. SP3 meanwhile is the exhaust area, where the cool air produced by refrigerant 30 can be returned to the cooling device 300. The plank separating SP1 and SP2, and the plank separating SP2 and SP3 are made of insulated materials. These plank(s) also include a fan in them that circulates the cooled air. The details of the fan are described later in the document, and references to said fan require FIG. 4.

At the bottom of the 3 spaces listed previously, the upper drain pan 16 is placed. Beneath it is the lower drain pan 17. This means that inside container 100, upper drain pan 16 is placed parallel between spaces 1 through 3 and the bottom drain pan 17. Drain pan 17 is placed parallel between the upper drain pan 16 and the insulating items storage space 20. Both upper and lower drain pans 16 and 17 are made of insulating materials. There are holes placed in both the upper and lower drain pans 16 and 17, so that the cool air provided via the refrigerants 30 in SP2 flow through and into the insulating items storage space 20. The cool air flows through the holes and into storage space 20. For details about the designs of the upper and lower drain pans 16 and 17 respectively, please refer to FIG. 8.

In addition, adjusting mechanism 19-1 is placed on the side surface of the lower drain pan 17 (the left-hand side in the figure), and in contrast adjustment mechanism 19-2 is placed on the side surface of lower drain pan 17 as well (this is on the right-hand side in the figure). Adjusting mechanisms 19-1 and 19-2 allow the lower drain pan 17 to ascend or descend, such that based on the controls of the controlling mechanism 18 (which will be described in detail later in this text), the lower drain pan can be moved upwards or downwards.

As the lower drain pan 17 is adjusted to go up or down based on the adjusting mechanisms 19-1 and/or 19-2, the controlling mechanism 18 can adjust the distance between the upper and lower drain pans 16 and 17. Thus, depending on these adjustments, the cool air that flows into the insulating items storage space 20 via the refrigerants in SP2 can be adjusted. This means that the cooling temperature of the insulating items storage space 20 can be adjusted.

The adjusting mechanisms 19-1 and 19-2 are possible via motors and the rotating motion of motors, so as to change the linear motions. The switching of the motor's rotational motions into linear motions going up or down is possible through mechanisms that are comparable to that of a ball screw or even a rack and pinion.

In addition, the control unit 18 is placed below the adjusting mechanism 19-1, which is also on the left-hand wall of the insulating item storage space 20. Control unit 18 performs various control tasks related to container 100. It is noteworthy that control unit 18 can be placed arbitrarily. For instance, it does not have to be placed inside of the insulating items storage space 20—it could also be placed inside of the refrigerant storage space 10.

Control unit 18 acts as a signal line to control adjusting mechanisms 19-1 and 19-2. Control unit 18 is connected to adjusting mechanisms 19-1 and 19-2, so that by transmitting signals, lower drain pan 17 can be raised or lowered via adjusting mechanisms 19-1 and/or 19-2.

In addition, control unit 18 is built with an RFID (radio frequency identifier) reader function, so that it is able to communicate with the RFID tag 31 in the refrigerant 30. Therefore, based on the temperature sensor included in the RFID tag 31, control unit 18 is able to detect the temperature (of the refrigerant 30 insides). Communicating with the RFID tag 31 relies on ultra-high frequencies (UHF). This makes a large amount of information available instantaneously through the RFID tag 31. The control unit 18 is also able to communicate via Bluetooth (registered trademark). This also allows communication with an external device. What's more, control unit 18 is connected to the temperature sensor placed inside the insulating items storage space 20 (not shown in the figures), so that it is able to acquire information on the temperature measured inside of the insulating items storage space 20.

In addition, control unit 18 has a battery on the inside and outside (not shown in the figure). Even if the control unit 18 is cut off from the power supply, it is possible to operate using a charged battery. The power supply to control unit 18 is possible through the cooling device 300, which is mentioned later in this text. This means that in this implementation, cooling device 300 provides cool air and power at the same time to container 100. Control unit 18 would at this time, recharge its batteries while the power supply is coming in through the cooling device 300. This same power that is charging the batteries operates adjusting mechanism 19-1 and adjusting mechanism 19-2, as well as operates fans 14 and 15, mentioned later in this text.

Control unit 18 can be realized using hardware such as ASIC (application specific integrated circuits) or FPGA (field-programmable gate arrays). In addition, control unit 18 can also be realized using storage devices that already have the program saved, such as ROMs (read-only memory) or CPUs that can perform arithmetic logic based on said program. This also means that operations can be realized through the combination of hardware and software. Control unit 18 is also insulated and tightly covered, so as to be water resistant and still functional when placed inside the refrigerated insulating items storage space 20. Control unit 18 in other words is water proof, so that the hardware does not break down.

In the figures described, with readability in mind, the control unit 18 as well as adjusting mechanisms 19-1 and 19-2 were omitted.

Figure 4:
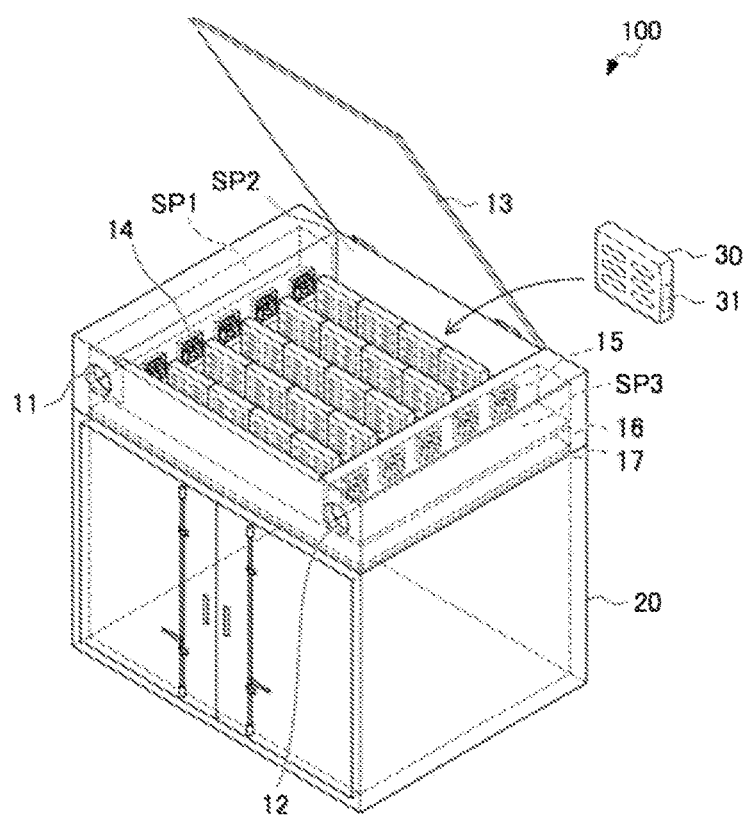
FIG. 4 illustrates an oblique drawing of the container, in the invention's first implementation.

The next section refers to FIG. 4, which is an oblique drawing of container 100. In particular, the text aims to explain the configuration of the inside of the refrigerant storage space 10.

With respect to FIG. 4, since the opening and closing area 13 is open on the surface of container 100, it is possible to observe SP2. The opening and closing part of container 100 will actually be made of insulating materials, such that it'd be impossible to see SP1 or SP3 inside. However, since FIG. 4 is meant to describe SP 1 and SP3, the left and right sections of the opening and closing area 13 on container 100's surface is illustrated as transparent.

Users are able to open the opening and closing area 13 of container 100 in order to store refrigerant 30 in the chamber, which is SP2. SP2 is able to store several of refrigerant 30, and the number or size of said refrigerants are arbitrary. In order for a clearer figure, only 1 of the several potential refrigerants is numbered as refrigerant 30.

When cooling the refrigerant 30 using the cool air provided by the cooling device 300, it is necessary to cool each of the refrigerant 30 evenly. In order to do this, in this implementation, refrigerant 30 was placed strategically throughout its storage location to receive cool air evenly. Furthermore, users will have access to the storage positions and placements that are optimal for the refrigerant 30, in order to realize this. For instance, a groove could be an aspect that can be used for the refrigerant 30 placement—which is included in the design. Other means include designing a rack that would allow storage of refrigerant 30. In the figure, it is noteworthy that the planks illustrated are of a pre-determined thickness for the refrigerant 30 to be stored standing up. However, it is possible to store refrigerant 30 on its side as well. This illustration is but one example. It is also possible to stack multiple of refrigerant 30, or any other combination of storage options.

Thus, when refrigerant 30 is stored in SP2, and the insulating items are stored in the insulating items storage space 20, the refrigerant 30 is able to cool the insulating items. To be exact, the refrigerants stored inside of refrigerant 30 change from solid to liquid overtime, with outside influences such as temperature. Then, the refrigerants absorb the surrounding heat, caused by the latent heat from melting and the phase change from solid to liquid. This allows the gas surrounding refrigerant 30 to cool down. The air cooled down in this matter will pass through the upper drain pan 16 and the lower drain pan 17 due to the gravity, falling into the insulating items storage space 20 and then diffusing. This is the means of cooling the inside of the insulating items storage space 20.

Further, when the refrigerants filling the refrigerant 30 completely melt after the passage of time, and it is not possible to cool down the surrounding area of refrigerant 30, then the cooling device 300 will provide cool air to refrigerate refrigerant 30 again. Thus, refrigerant 30 can be reused.

Each of the accumulating refrigerant 30 can be shaped into a plank-like shape to the desired width. Not only that, refrigerant 30 should be rectangular, based on a planar view. Each of refrigerant 30 will also be a hollowed out box-like case, that can be filled with refrigerants. Such a case for the refrigerants, like refrigerant 30, would be designed using a resin material.

Refrigerants that can be placed inside of refrigerant 30 would be made up mainly of water, with a high latent heat of fusion, as well as cryogens (coolants) and gel forming agents. If necessary, nucleating agents, coloring agents and preservatives can also be added.

The melting point of the refrigerant can be adjusted, based on the amount of cryogen (cooling agent) and type of refrigerant added. Specifically, the refrigerant content should be adjusted based on the needs of the insulating items (what is the desired melting point), that will be stored in the insulating items storage space 20. For instance, if an insulating item needs to be refrigerated, then refrigerants will be modified so that the insulating items storage space 20 can be close to 5° C. Meanwhile, if an insulating item needs to be frozen, then refrigerants will be modified so that the insulating items storage space 20 can be close to −20° C. The insulating items can be kept at the desired storage temperature, that is not either of the two examples listed.

By adding a gel agent to the refrigerant, the refrigerant can maintain an appropriate amount of viscosity in its stable gel form. Refrigerants appropriate for this implementation are different from the generic refrigerants based on highly water absorbent resins. Rather, refrigerants used in this cooling system are a mixture of sodium chloride and a gel agent, such that it is possible to keep to its constant form at any arbitrary temperature. Furthermore, refrigerants that would be used in this implementation would be different from the generic refrigerant, in that it is made up of materials that can keep the temperature of insulating items storage space 20 constant for a long period of time. This means that refrigerant 30 in this implementation has a superior thermostatic function of keeping the temperature constant for a long period of time, in comparison to generic refrigerants. Refrigerant 30 in this case would be realized through an ice battery (registered trademark) developed by ITE Co., Ltd.

Inside refrigerant 30, an RFID tag 31 is placed that can detect temperature. This RFID tag 31 is realized through a passive tag 31, which means that there is no need to include a battery inside of refrigerant 30 that requires a power supply for said RFID tag 31. The RFID tag 31 receives a radio wave signal from control unit 18, which activates the RFID tag 31 once this radio wave causes an electromagnetic induction. Then, the temperature surrounding the RFID tag 31, as detected by the temperature sensor in the RFID tag 31, is measured (this is essentially the temperature inside of the refrigerant 30). The temperature measured is then relayed back to the control unit 18.

It is noteworthy that an RFID tag 31 is not necessary in every refrigerant 30 that is stored in SP2. Rather, the RFID tag 31 should be placed inside only some of the refrigerant 30. This is because based on the storage location of the refrigerant 30, the control unit 18 is able to determine whether or not refrigerant 30 is adequately being refrigerated. Only some of the temperatures of refrigerant 30 are necessary, and only a few of the refrigerant 30 require the RFID tag 31 that measures temperatures.

To wit, the temperature of the refrigerant 30 placed in the center of the plane of SP2, or the temperatures of the refrigerants 30 placed in the four corners of SP2, or the 9 refrigerant 30s placed in a rectangular shape in regular intervals on the plane of SP2, can all be measured. Then, should these temperatures match the desired temperatures (for instance, the temperatures can be equal to or lower than the freezing point(s) of the refrigerant 30(s)), it is determined that all refrigerant 30s have been adequately cooled. In this case, the temperature of the center refrigerant 30 out of 3 placed in a row can be measured, and this single refrigerant 30 can be used as the basis to determine whether or not the temperature is adequate.

In addition, as is shown in FIG. 4, the plank material that separates SP1 and SP2 would have several fans (fan 14) placed in it, to direct the cool air coming out of the cooling device 300 into SP2. In the plank material separating SP2 and SP3, there are also several fans placed (fan 15) that would direct the cool air after the air was directed to refrigerate refrigerant 30, back to the cooling device 300.

Figure 6:
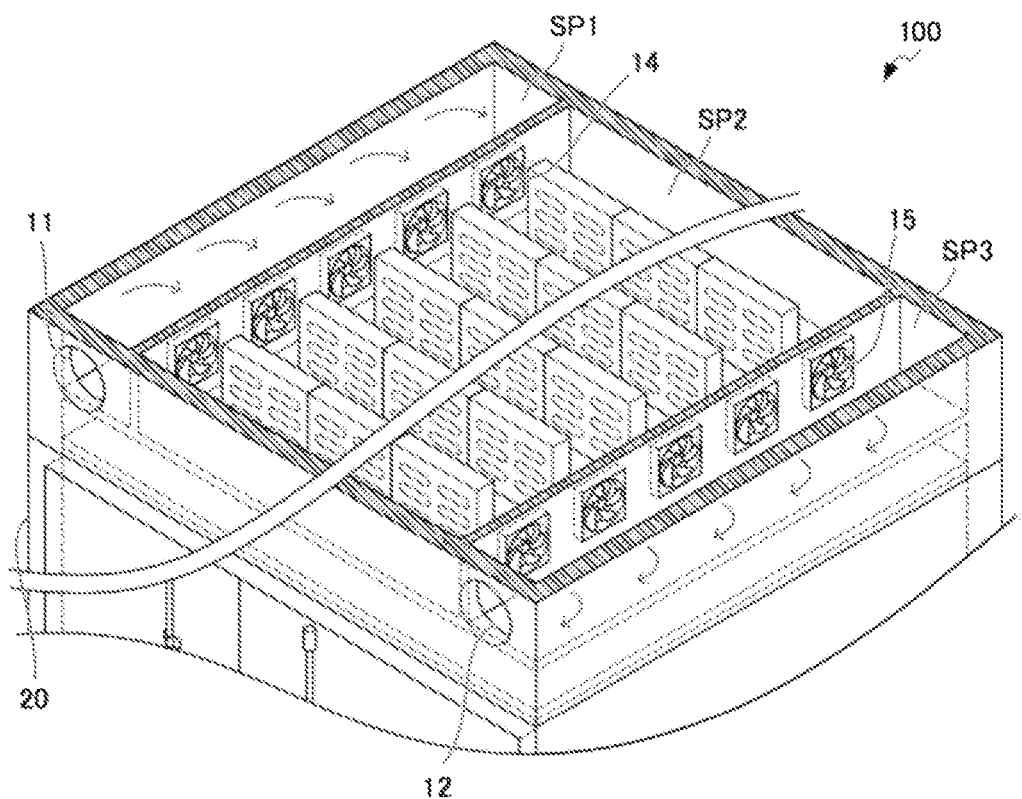
FIG. 6 illustrates an oblique drawing of the first implementation of this invention, showing the container and fan.
Figure 7:
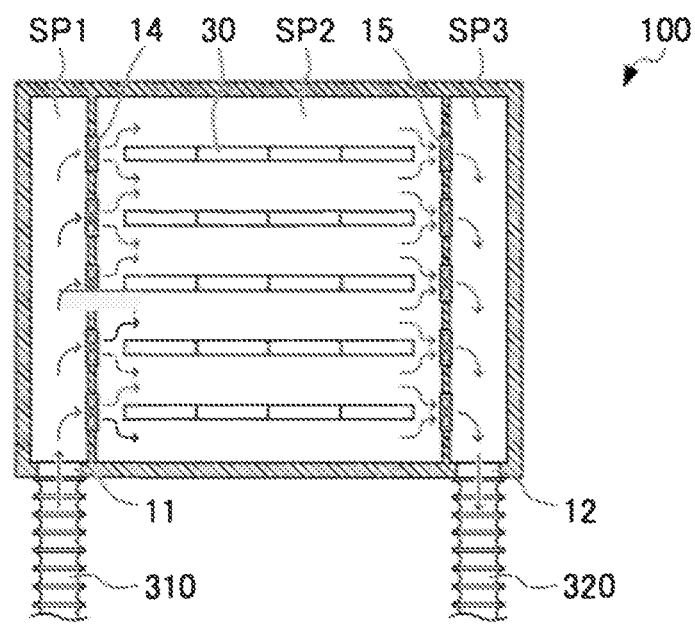
FIG. 7 illustrates a plain view of the first implementation of this invention, showing the container and the cool airflow caused by the fan.

These fans 14 and 15 are utilized in the circulation of cool air, from cooling device 300 and back. Refer to FIGS. 6 and 7 to understand the air circulation provided by these fans. It is noteworthy that, due to illustration purposes, in the figures previously mentioned as well as several others, only 1 of fans 14 and 15 are labeled respectively.

Figure 5:
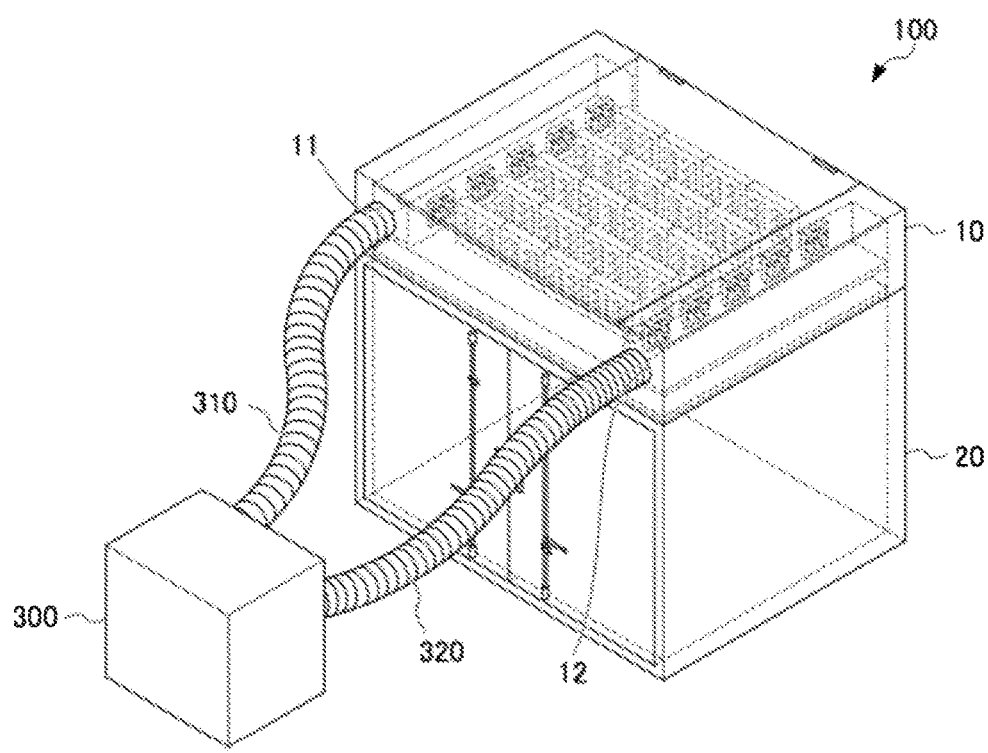
FIG. 5 illustrates an oblique drawing of the first implementation of this invention, where the container and the cooling device are connected.

Next, refer to FIG. 5 in order to understand the explanation of the connection between container 100 and cooling device 300. As FIG. 5 shows, the cooling device 300 includes supply pipe 310 and recovery pipe 320.

Cooling device 300 is able to provide cool air to container 100 through supply pipe 310. Then, once the cool air has passed through container 100 and refrigerated the refrigerant 30, the cool air is recollected via the recovery pipe 320. Furthermore, cooling device 300 is able to recycle the cool air by cooling the air collected via the recovery pipe 320, and returning it to container 100 via the supply pipe 310. This means that the cooling device 300 is able to efficiently refrigerate and cool refrigerants 30 through circulating cool air.

The start and end of operations performed can be controlled by the user, based on a power switch being switched. However, other methods are also possible.

For instance, the physical connection of the suction connector 11 and the supply pipe 310, as well as the physical connection of the recovery pipe 320 and the ejecting connector 12 can trigger the operations to start. Similarly, removing the pipes from the connectors can also trigger the operations to end.

Otherwise, control unit 18 can also turn the operations on and/or off. When controlling through the control unit 18, for Bluetooth communication with control unit 18, a communication device should be placed in the cooling device 300.

The supply pipe 310 and recovery pipe 320 are made of insulated material, so that the cool air circulating does not increase in temperature from external heat. Furthermore, in order for users to be able to easily remove pipes 310 and 320, the pipes 310 and 320 should be made of a flexible material. In addition, pipes 310 and 320 will include a power supply line for the power supply, in order to be able to operate the control unit 18, the adjusting mechanisms 19-1 and 19-2 in the cooling container 100. In addition, when the supply pipe 310 and recovery pipe 320 are connected to the container 100, the cooling device 300 supplies power through the power line to each of the necessary areas in container 100. This power supplied can then charge the battery (not shown in the figure). A communication line can also be incorporated, aside from the power line, in order for control unit 18 and cooling device 300 to transmit information.

The user can connect the supply pipe 310 to the suction connector 11. The user can also connect the recovery pipe 320 with the ejecting connector 12. These connections are set in place so that the cool air does not leak out to the outside. This is possible where one of the connecting screws is a 'male screw', while the other has a 'female screw,' and users are able to use both to connect. By doing so, the screw's threads will prevent cool air from leaking more, with an air-tight connection. In this case, if the male screw's tip's outer diameter is larger than the diameter of the, so that the screw is tapered, it can be further air tight. Other connections possible would be a flange connection, for instance.

If the supply pipe 310 and recovery pipe 320 are not connected, then it is necessary to prevent cool air from leaking. In order to do that, in a similar manner as how the supply pipe 310 and recovery pipe 320 would be connected, the suction connector 11 and ejecting connector 12 would need a similar insulating material to work as an attachment means.

Cooling device 300 ejects cool air through the supply pipe 310, to provide cool air into container 100. Furthermore, cooling device 300 is able to absorb cool air via the recovery pipe 320, thus circulating the cool air efficiently.

Cooling device 300 includes a compressor, a condenser, an expansion valve and an evaporator. The compressor takes the low temperature low pressure refrigerant in gaseous state, and compresses this even more to create a high temperature, high pressure gaseous refrigerant. Refrigerants in its high temperature high pressure gaseous state release thermal energy when passing through the condenser, changing into liquid refrigerants at low temperature high pressure. The expansion valve on the other hand, lowers the pressure of the liquid refrigerants, controlling the flow rate of the liquid refrigerant. With the low temperature low pressure liquid refrigerants, when passing through the evaporator, the heat is absorbed and vaporized, lowering external temperatures. This mechanism allows the refrigerant 30 collected from container 30 through the recovery pipe 320 to cool, returning the temperature rising air to be cooled down again to −60° C. This re-cooled cold air can be returned to container 100 via supply pipe 310.

In this case, the low temperature low pressure liquid refrigerant that has lowered the outside temperature can be vaporized into a gaseous refrigerant, with low temperature and low pressure. Next, this low temperature low pressure gaseous refrigerant is sent to the compressor. The compressor takes the low temperature low pressure gaseous refrigerant, compresses this even more, into a high temperature, high pressure gaseous refrigerant. As a result of the above-mentioned steps taken, a new cycle can be started, so that a repetition of these steps re-cools the cold air.

Since this design for cooling device 300 can be realized by a generic design for other refrigeration circulation units, it is not necessary to show in the figure.

Next, refer to FIGS. 6 and 7 to understand the operations of fan 14 that allow the discharge of cool air coming out of cooling device 300, and fan 15 that allows the return of cool air back into cooling device 300. Furthermore, the steps involved in the airflow of cool air through SP1, SP2 and SP3 will be described in detail.

With regards to FIG. 6, this is an oblique drawing of container 100. Meanwhile FIG. 7 is a planar view of container 100. FIGS. 6 and 7 are similar to FIG. 4, in that SP1, SP2 and SP3 are all shown with transparent upper surfaces. With regards to FIG. 6, the center of container 100, including SP2, is omitted from the illustration.

The left side of FIG. 6 shows SP1 and SP2, as well as the fan 14 arranged on the plank that separates the two spaces. Despite how the figure shows 5 of the fan 14s, only 1 is labeled, due to illustration purposes. The number of fans can also be over or under 5, unlike the figure. Each of the fans are propeller-type fans, that rotate based on the amount of cool air ejected by the supply pipe 310 from the cooling device 300. The rotation speed in this example would be 500 rpm (rotations per minute). As fan 14 rotates, the arrow in FIG. 6 can be followed, where the cool air is absorbed through SP1, and ejected into SP2. It should be noted, that the fan 14 operates electrically, and the fan 14 rotates based on the electric power, so aid in the supply and circulation of air.

On the other side, as can be seen on the right side of FIG. 6, fan 15 is placed in the planks separating SP2 and SP3. Regarding the design and function of fan 15, it is relatively similar to that of fan 14. While the designs of fans 14 and 15 are similar, the propellers can be set to face the other way. Thus, when the cooling device 300 suctions the cool air from the recovery pipe 320, based on the suction power of the cool air, the fan 15 rotates. This is visible in the arrows in FIG. 6, whereas the cold air flows through SP2 to refrigerate refrigerants 30, then is ejected into SP3. It is possible to increase the fan 15 activities via electricity, in order to increase the suction rate.

As is described, based on the functions of fan 14 and 15, the cold air's airflow can be seen via the directional arrows flowing through SP1, SP2 and SP3 in FIG. 7.

This means that cool air is provided to SP1 from the cooling device 300 through the supply pipe 310. Then, the cool air is directed by each fan 14, so as to eject the cool air into SP2. This means that fan 14's role is to direct cool air from SP1 into SP2.

In order to even out the spread of cool air flowing through fan 14, the refrigerant 30 need to be placed strategically. This means that by cooling the refrigerant 30(s), the flowing air's temperature increases. This air that had already refrigerated the refrigerant 30 will be ejected into SP3 via fan 15. Fan 15s' functions are to introduce the cool air from SP2 to SP3. This air flow is akin to the suction of a vacuum cleaner.

The cool air that is ejected into SP3 after the refrigerant 30 has been cooled is returned to the cooling device 300 with the recovery pipe 320. The cool air that is returned to the cooling device 300 then resupplies the re-cooled air back into supply pipe 310. This is also visible in FIG. 5

By taking the cool air and recirculating it, refrigerant 30 is more efficiently refrigerated. For instance, a normal temperature refrigerant 30 would take at most 2 hours to quickly freeze.

In the figure, in order to understand the functions more clearly, refrigerant 30 have been illustrated as larger than life. Furthermore, the space between the refrigerant(s) 30 have been exaggerated in the figure inside SP2. In reality, each of the refrigerant 30 are actually quite small. The refrigerant 30s would also be placed much closer to each other, so that more refrigerant 30s can be stored. Therefore, the figure is not true to life in that the density should be higher. Either way, it should be noted that refrigerant 30 could each be equally refrigerated and frozen at the same time. In this case, if fans 14 and 15 have the suction and ejection means that are spread uniformly, it would be better. For locations that are difficult, for instance, for suction and ejection functions (such as further down from connectors 11 and 12), the fan 14 and 15 should be designed larger than the other fan 14 and fan 15. This would make the airflow of the suction and ejection via each fan 14 and 15 even.

Figure 8:
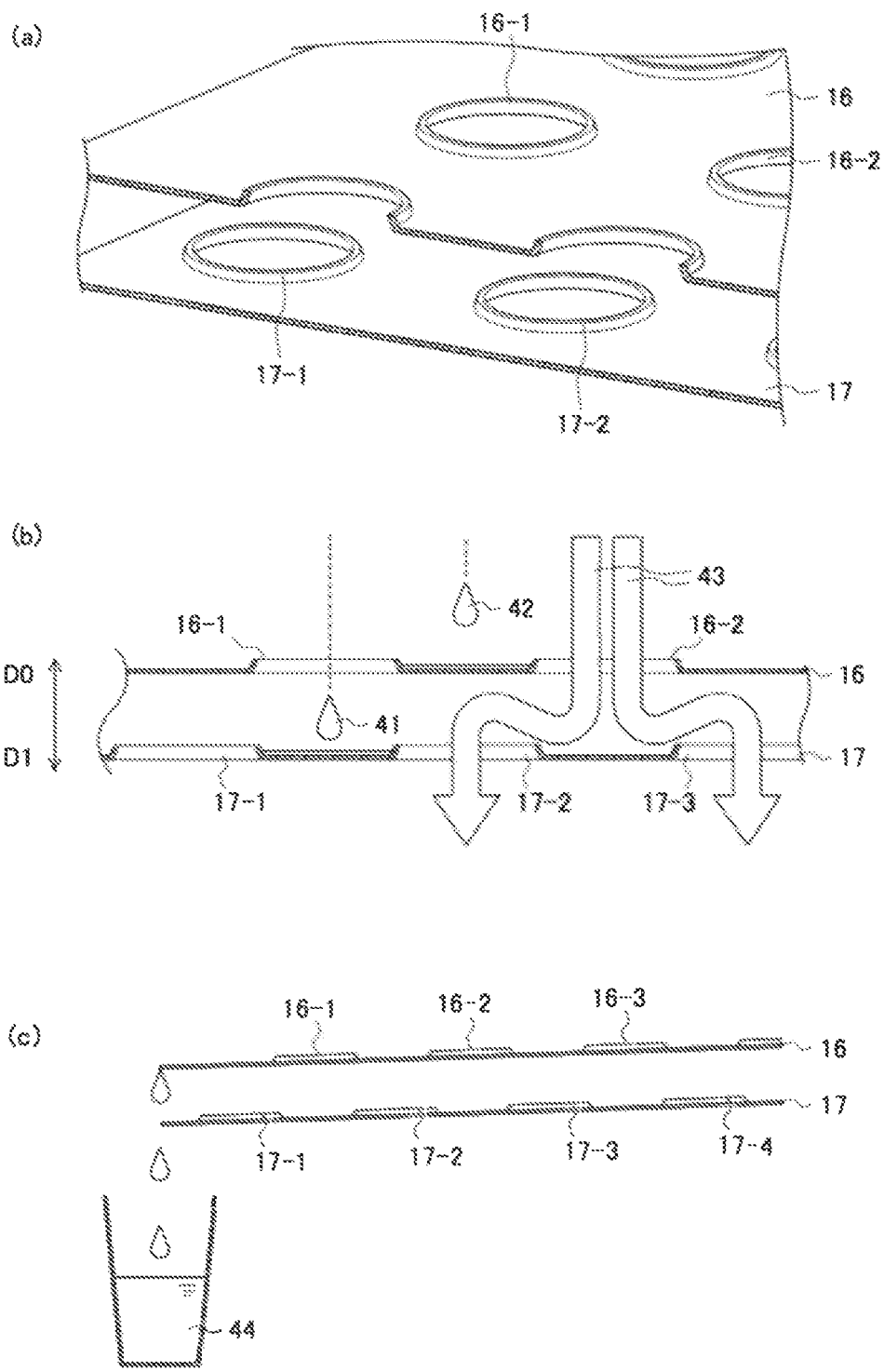
FIG. 8 illustrates the drain pan of the invention's first implementation.

Next, the texts describing the upper drain pan 16 and lower drain pan 17 require references to FIG. 8.

In this implementation, the refrigerant 30 stored in SP2 refrigerate the insulating items storage space 20. This requires the cool air that the refrigerant 30 provides in SP2 to flow into the insulating items storage space 20. The cool air would flow through into the insulating items storage space 20. In this case, as time goes by, water drops will form due to the condensation on the surface of the refrigerant 30. In this scenario, it is not ideal for the water drops to drop into the insulating items storage space 20 or onto the insulating items stored in said space. Thus, the upper drain pan 16 and lower drain pan 17 come to use, placed directly beneath SP2. The water that would drop is prevented from contact with insulating items.

In this scenario, if blocking the water drops were the only purpose, then the upper drain pan 16 and lower drain pan 17 can be designed as plates with no holes or gaps, arranged horizontally beneath SP2. However, when designed in this manner, the cool air produced through refrigerant 30 cannot reach the insulating items storage space 20. As a result, it would not be possible to refrigerate the insulating items stored in the insulating items storage space 20. This is a dilemma, whereas if the upper and lower drain pans 16 and 17 respectively are designed with a mesh board or with holes, the water drops down on the insulating items.

In light of this, while upper and lower drain pans 16 and 17 respectively have holes provided, when placed within container 100, the holes of the upper drain pan 16 and the holes of the lower drain pan 17 do not overlap. This design allows the condensation to drop from the refrigerant 30 surfaces onto the upper drain pan 16. Even when the water drops go through the holes, this water cannot pass through the holes of the lower drain pan 17, preventing the insulating items from getting wet.

With regards to these points, it is necessary to reference FIG. 8 (a), which shows an oblique drawing of the upper drain pan 16 as well as lower drain pan 17. As is visible in the illustration, several holes are provided in the upper drain pan 16 (upper drain pan 16-1, 16-2, as labeled). Meanwhile, the lower drain pan 17 placed inside container 100 also has holes provided that do not overlap with 16-1, labeled as 17-1 and 17-2. In addition, the periphery of the holes provided are designed to be raised, so that the water that collects cannot flow down an adjacent hole. While the holes' shapes can be circles, they can also be of any other design, such as a polygon or rectangle, etc.

The next description of the water and condensation flow requires reference to FIG. 8 (b), showing the upper drain pan 16 and lower drain pan 17. First, water (water drop 41) drops down on the upper drain pan 16-1 center. In this example, this water drop 41 will penetrate through the upper drain pan 16-1. However, beneath the upper drain pan 16-1, there is no lower drain pan 17-1 or lower drain pan 17-2. Thus, water drops 41 will drop to surfaces that are not the lower drain pan 17. As previously listed, the periphery of the holes in the lower drain pan 17-1 and 17-2 are raised. Therefore, water drops 41 will not flow down into the lower drain pan 17-1 or 17-2. Thus, the water that drops (water drops 41) will not touch the insulating items.

Meanwhile, the water drops 42 will fall down on the surface between the upper drain pan 16-1 and upper drain pan 16-2. Even in this case, the periphery of the holes of upper drain pan 16-1 and 16-2 are raised. Thus, the water drops 42 cannot flow into the holes nearby, resulting in the overall prevention of water drop 42 from reaching the insulating items.

The following text refers to FIG. 8 (c), describing the condensation of water that drops on the upper drain pan 16 and lower drain pan 17. Upper drain pan 16 and lower drain pan 17 are designed to be on an incline. For instance, as seen in the figure, the incline could be from the right to left. This allows the condensation that collects to flow to the left side, along the ridges of the holes' periphery. In order for the water to be adequately drained, the drain section 44 is designed. The drain section 44 is realized through a drainage groove provided, with an outlet to the outside of the container 100, acting as a drain water storage tank. As a result, the water that drops into the area cannot overflow and fall onto the insulating items.

On the other hand, when referencing FIG. 8 (*b*), viewers can see that the cool air surrounding refrigerant 30 (cool air 43) falls due to gravity. Cool air 43 then passes through the holes of drain pan 17-1 and 17-2 to reach the insulating items.

Thus, FIG. 8 reflects the functions of the upper drain pan 16 and lower drain pan 17, and how the water drops from condensation can be prevented from reaching the insulating items, all the while allowing cool air to reach the insulating items and refrigerate said items.

As described above, in this implementation, control unit 18 controls the adjusting mechanisms 19-1 and 19-2, to lower or raise the lower drain pan 17. Control unit 18 in essence is able to control the distances between the upper drain pan 16 and lower drain pan 17. This adjustment can then control the airflow of the cool air provided by the refrigerant 30 in SP2 into the insulating items storage space 20. This means that this mechanism as a result controls the temperature of the insulating items storage space 20.

This explanatory text requires references to FIG. 8. As is seen on the left side of the FIG. 8 (B), if the position of the upper drain pan 16 is hereinafter known as D0, then the position of the lower drain pan 17 is also hereinafter known as D1.

In this case, as the distance between D0 and D1 increases, it becomes more difficult for the cool air (referred to as cool air 43) provided by refrigerant 30, to remain in the insulating items storage space 20. In other words, cool air is less likely to travel to the insulating items storage space 20. Thus, for instance, even after cooling the refrigerant 30, if the insulating items storage space 20's temperature is detected as higher than desired, then adjusting mechanisms 19-1 and 19-2 can lower the lower drain pan 17. This mechanism increases the distance between D0 and D1. Based on the situation, for instance, the distance between D0 and D1 can be changed by 15 mm, which would change the temperature in the insulating items storage space 20 by some 10° C.

On the other hand, as the distance between D0 and D1 decrease, it becomes difficult for the cold air supplied by the refrigerant 30 (in this instance, referred to as cool air 43) is less likely to flow into the insulating items storage space 20. Therefore, for instance, while the cooling device 300 cools the refrigerant 30, in order to prevent the cooling device 300's cool air from reaching the insulating items storage space 20 or the insulating items, the adjusting mechanisms 19-1 and 19-2 would come into play so that the D0 and D1 distance is shortened. This adjusts the amount of cool air that reaches the insulating items storage space 20. For instance, if the cool air coming out of the cooling device 300 is at −60° C., and the insulating items should be refrigerated at +5° C., then the distance between D0 and 131 can be shortened until the insulating items storage space 20 temperature is at or around +5° C., via the controlled amount of airflow into the insulating items storage space 20. In addition, if the insulating items storage space 20 has yet to store insulating items, then it is not necessary to keep said storage space 20 cool. The distance between D0 and D1 should be at 0, so that the upper and lower drain pans 16 and 17 respectively are in close contact, such that the refrigerant storage space 20 is hermetically sealed. This would most efficiently refrigerate and cool the refrigerant 30.

It is not necessary to provide holes 16-1 and 16-2 on the entire surfaces of the upper drain pan 16 and lower drain pan 17, respectively. Rather, the upper drain pan 16 can move upward or downward together with the lower drain pan 17.

In addition, refrigerant 30 should not be directly stacked on top of upper drain pan 16. Rather, a mesh board so to speak could be placed on top of the upper drain pan 16, so that the refrigerant 30 can be placed on top of this mesh board material.

Figure 9:
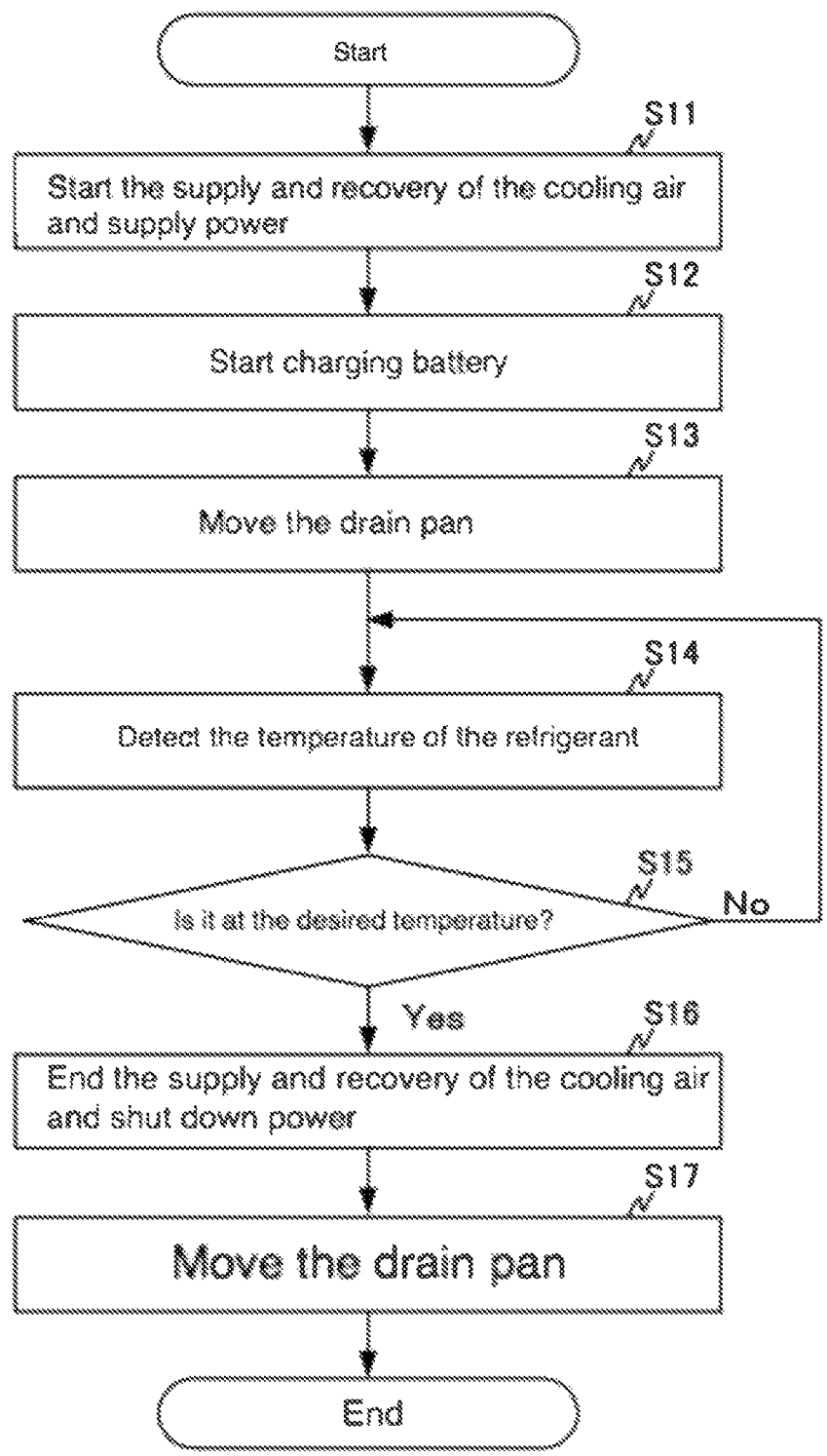
FIG. 9 illustrates a flowchart of operations, when cooling the refrigerant in this invention.

Next, refer to the flow chart on FIG. 9 to understand the steps in the operation required to cool refrigerant 30 in this implementation.

First, as a premise, if the cooling device 300 is not operating, then the power source must be turned on in order to start the cooling device 300. Then, users can connect the supply pipe 310 to the suction connector 11, as well as connect the recovery pipe 320 to the ejecting connector 12. This triggers the cooling device 300 to provide cool air through supply pipe 310 and receive circulated air through recovery pipe 320, all the while providing power (step 11). It is also possible for users to start the cooling device 300, after connecting supply pipe 310 with suction connector 11 and recovery pipe 320 with ejecting connector 12.

Depending on when the power supply started to flow, control unit 18 is activated. Thus, control unit 18 begins charging the battery using the power supply (step 12).

In addition, control unit 18 is able to control the up and down movements of lower drain pan 17 via the adjusting mechanisms 19-1 and 19-2, so that the upper drain pan 16 and lower drain pan 17 can be in close contact (step 13). As previously mentioned, this function is in place so that refrigerant 30 can be refrigerated even more efficiently. Further, if insulating items have already been stored into the insulating items storage space 20, then the upper drain pan 16 and lower drain pan 17's distances can be adjusted to make the insulating items meet the correct temperature.

Next, the control unit 18 is able to detect the temperatures inside the refrigerant 30 stores in SP2, based on the RFID tag 31's transmissions (step 14).

Given the information received about the temperatures inside refrigerant 30, control unit 18 can determine whether or not each of the refrigerant 30 have been adequately refrigerated. To be more specific, it is possible to determine whether or not each of the temperatures detected of refrigerants 30 are at the correct temperature (step 15). As previously mentioned, not all of the refrigerant 30 stored in SP2 need to have the temperatures detected. A few temperature detections would suffice for an overall understanding.

If the temperature detected of refrigerant 30 at this step is not sufficient (for instance, if refrigerant 30 needs to be at freezing temperature), then it is a 'no' to step 15. In this case, since refrigerant 30 requires additional refrigeration, the system needs to return to step 14 and the cycle of determining the refrigerant 30 temperature needs to be repeated.

Then, given this step, if the refrigerant 30 temperature meets the predetermined expectation ('no' on step 15), then the control unit 18 will determine that refrigerant 30 has been adequately refrigerated.

Thus, control unit 18 sends a signal to the cooling device 300, so that the cool air can be supplied and recovered, and the electric power supply can be terminated (step 16). Control unit 18 however does not always have to send instructions based on signals. Rather, the control unit 18 could send an alarm to the user, based on the temperatures detected through various sensors in the refrigerant 30, so that the user can shut off the power supply of the cooling device 300 and end the supply and recovery of cool air as well as the electric power. If however, control unit 18's battery is still being charged, then the cool air supply and recovery can be ended while the power supply to the battery continues.

As previously listed, even if the refrigerant 30 stored are all the same, depending on how the distance between the upper drain pan 16 and lower drain pan 17 are adjusted, the temperature inside the insulating item storage space 20 can change. Therefore, control unit 18 must operate the adjusting mechanisms 19-1 and 19-2 to adjust the lower drain pan 17 into the desired location. This way, the distance between the upper drain pan 16 and lower drain pan 17 can be adjusted to the desired distance (step 17). Said distance would be predetermined and depend on the refrigerant 30$s'$ types stored. For instance, if the insulating item requires refrigeration at +5° C., then based on the refrigerant 30 stored in SP2, the insulating items storage space 20 must be kept at +5° C. or so, by adjusting the distance that the cool air travels before reaching insulating items storage space 20. In this case, the control unit 18 would acquire information from the temperature sensor placed inside the insulating items storage space 20 about the temperature of the storage space 20. This temperature would then determine the lengths and distances at which the units should be operating.

In this way, when the insulating items are stored in the insulating items storage space 20, the insulating items can be placed within the appropriate temperature, allowing insulating items to be refrigerated. If the insulating items are not to be stored immediately, then step 17 can be skipped, and the upper drain pan 16 and lower drain pan 17 can be kept in close contact of one another. That way, since the cold air does not travel to the insulating items storage space 20, and the cooling time that relies on refrigerant 30 can be shortened.

Due to the cool air at temperatures such as −60° C., when cooling the refrigerant 30, it is possible for SP2 and some of the refrigerant 30 to become cooled too much. In such a case, after step 17, after a designated time such as an hour, once the refrigerant 30 temperature(s) are more stable, the insulating items can be stored to the insulating items storage space 20.

The implementation as described works due to the fans that circulate cool air provided by the cooling device 300. Separate fans also work to recover the cool air that enters storage spaces, back to the cooling device 300. By circulating cool air in this way, refrigerants are more effectively refrigerated.

According to this implementation, 2 drain pans are placed to more effectively refrigerate the refrigerants. These 2 drain pans can be adjusted, so that even if the same refrigerant 30 is stored, the insulating items storage space 20 can be adjusted to the desired temperature. Plus, based on the shapes of the 2 drain pans, the insulating items placed in the cooling container will not become wet from water drops.

As listed, implementation 1 is able to measure the temperatures of the refrigerants and/or the cooling container. Based on the measurements, the cooling device 300 and/or the drain pans can be adjusted, so that the cooling device 300 and drain pans can be utilized to reach optimal temperatures.

<Implementation 2>

The following is a text describing implementation 2 of this invention. This implementation's container 100, pallet 200, cooling device 300 as well as refrigerant 30 are relatively similarly designed and functional as that of implementation 1. No further explanation on each of said aspects should be required. In the following text, the differences between implementation 1 and 2 will be described in closer detail.

In this implementation, the cooling container management system includes container 100, the management server 600 which oversees container 100 management, and vehicle 500 that transports container 100.

Figure 10:
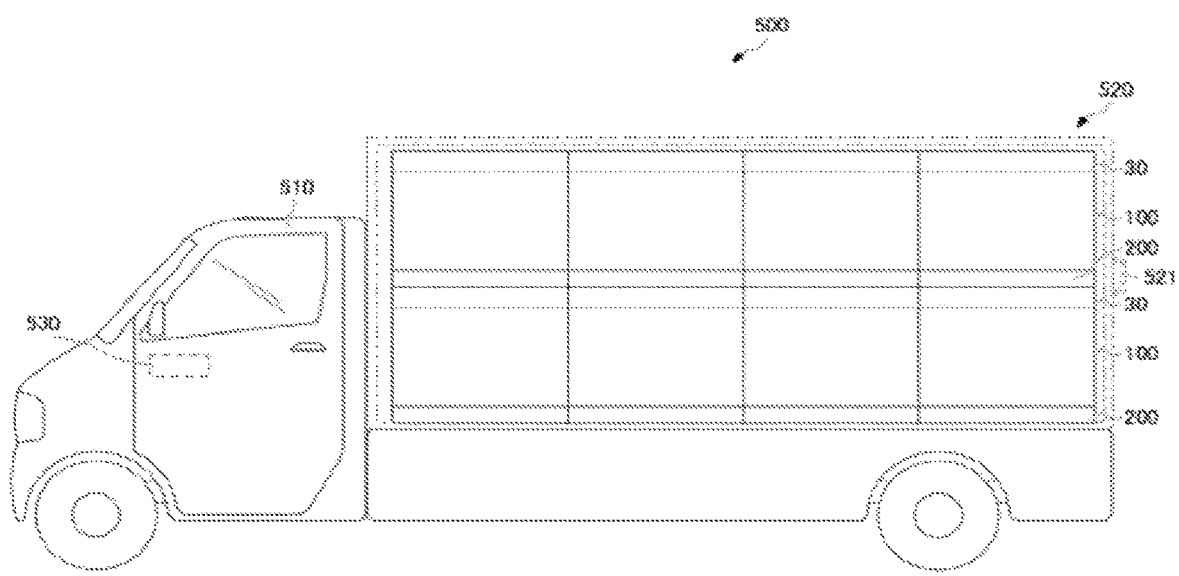
FIG. 10 illustrates a left-side view of the vehicle for the invention's second implementation.

First, refer to FIG. 10 for the details of the design of vehicle 500. As seen in FIG. 10, vehicle 500 includes the passenger compartment 510, the loading platform 520 and terminal 530. Furthermore, the loading platform 520 also includes the opening and closing handle 521. FIG. 10 refers to the design of vehicle 500, although part of the loading platform 520 is missing from the illustration.

Inside loading platform 520, you can see container 100 placed on pallet 200. To be specific, loading platform 520 has a door in the back that allows opening and closing, via the user using the opening and closing handle 521. As container 100 is placed on pallet 200, a forklift can then move pallet 200 and container 100 onto loading platform 520. For illustration purposes, as is the case for other figures, only 1 of the several (in theory) container 100/pallet 200 and refrigerant 30 are visible and labeled inside the loading platform 520.

As was explained in the description of implementation 1, container 100 is able to store refrigerant 30, cooled by the cooling device 300. Furthermore, the cooled refrigerant 30 is able to keep insulating items refrigerated, and thus vehicle 500 is able to transport cool insulating items without relying on a cooling device or system via a compressor, etc. Even if vehicle 500 were to be a vehicle equipped with a compressor-type cooling system, there is no need to operate them. Not only that, it is not necessary to supply power to container 100. This means that vehicle 500 can be a simple transportation device. Container 100 is able to keep cool and refrigerate via the refrigerant 30 stored within. This means that it is possible to adjust and transport different renditions of container 100 at different temperatures with custom refrigerant combinations and materials. In 1 vehicle 500, it is possible to carry several different insulating items, each requiring different cool temperatures.

Since passenger compartment 510 is where the driver is, this is technically the driver's seat. In this space, the terminal 530 is placed.

At this point, terminal 530 also has the function of communicating with control unit 18 in each of the container 100$s$ that are stored in the loading platform 520, via a communication standard such as Bluetooth, etc. Thus, when terminal 530 communicates with control unit 18, information can be acquired through control unit 18. The information acquired would include cooling container IDs which differentiate the container 100$s$ from each other through the control unit 18$s$ installed, or the temperature of the refrigerant 30 stored inside container 100, or the temperature of the insulating items storage space 20 in the container 100$s$. In addition, another information that is acquirable is the usage records, if/when the cooling device 300 was used to cool refrigerant 30. This usage record is acquired and saved by the control unit through transmissions with the cooling device 300. Usage record refers to information such as the cooling device 300 ID—an ID designated to cooling devices, and the usage start time for that same cooling device 300.

Terminal 530 has a navigation system akin to GPS (global positioning system). Based on this GPS system, it is possible to see the route of a traveling vehicle 500, and whether or not the vehicle is parked.

Furthermore, terminal 530 allows communication with the management server 600, which will be described in detail later in this text, through cell data or internet. Terminal 530 can then send information through either method to the management server 600. Information includes location (which terminal 530 can detect) or information acquirable from control unit 18 in container 100 stored in vehicle 500. However, with regards to the usage history of cooling device 300, terminal 530 will not send said information to management server 600 but rather, the cooling device 300 itself will send said information to the management server 600.

The information derived from terminal 530 can be automatically updated, or manually derived by the user's operations. The functions of terminal 530 would be realized through application software, incorporated into generic personal computers or tablets.

Figure 11:
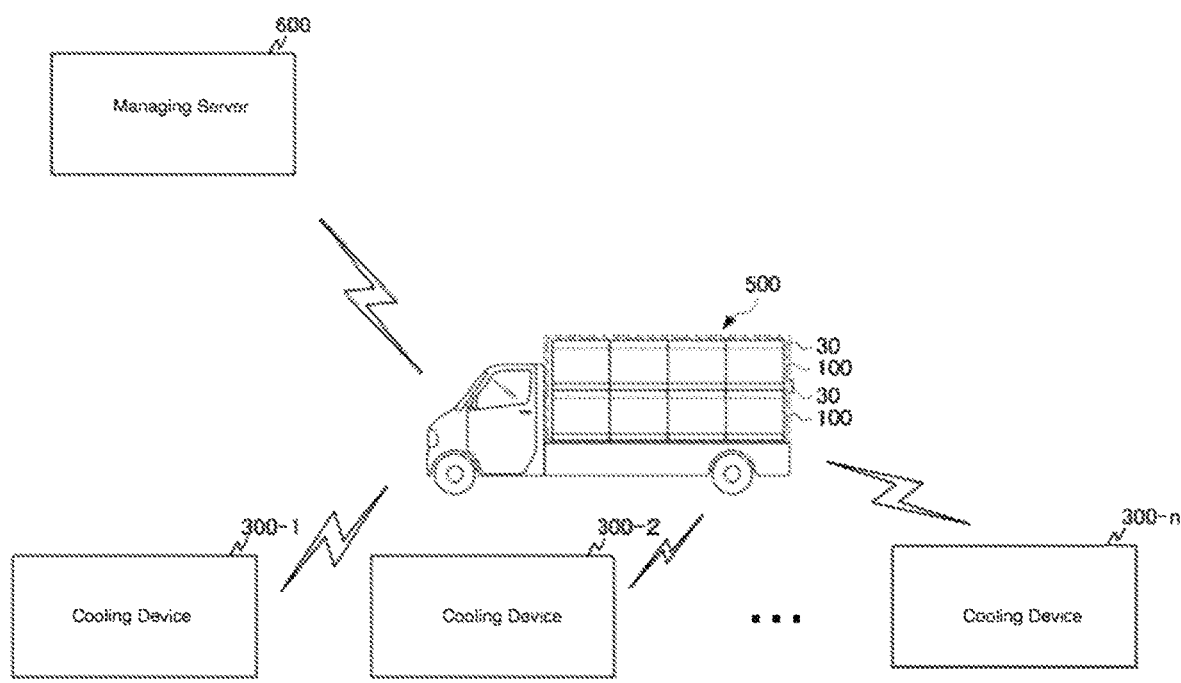
FIG. 11 illustrates a block diagram that shows the overall configuration of this invention's second implementation.

The overall implementation and design can be described with reference to FIG. 11. The implementation would, as previously described, store multiple container 100s in vehicle 500, where a management server 600 and several cooling devices 300 would be placed. While the illustration shows several cooling device 300s, other combinations such as additional vehicle 500s or more servers are possible.

Users of vehicle 500 are able to use the vehicle 500 by transporting container 100. When necessary, by using the cooling device 300 in various locations, it is possible to cool refrigerant 30 as well as charge the batteries. This means that the cooling device 300 can be utilized similarly as a gasoline stand for fuel.

Management server 600 is a server system with a communication function. Management server 600 is realized, similarly to that of terminal 530, through the application software and generic personal computers or generic server systems built in (as detailed below). The management server 600 is able to communicate with terminal 530 built into vehicle 500, as previously listed, in order to acquire various information regarding container 100.

The management server 600 then performs various functions, based on the information acquired. In conjunction, control unit 18 would also make adjustments to the lower drain pan 17, etc. These steps taken can be referenced in the flow chart detailed in FIG. 12. Given the following description, the detailed text is based on information being received by the management server 600 from terminal 530. However, some or all of the information can also be received via the control unit 18 or the cooling device 300 itself.

Figure 12:
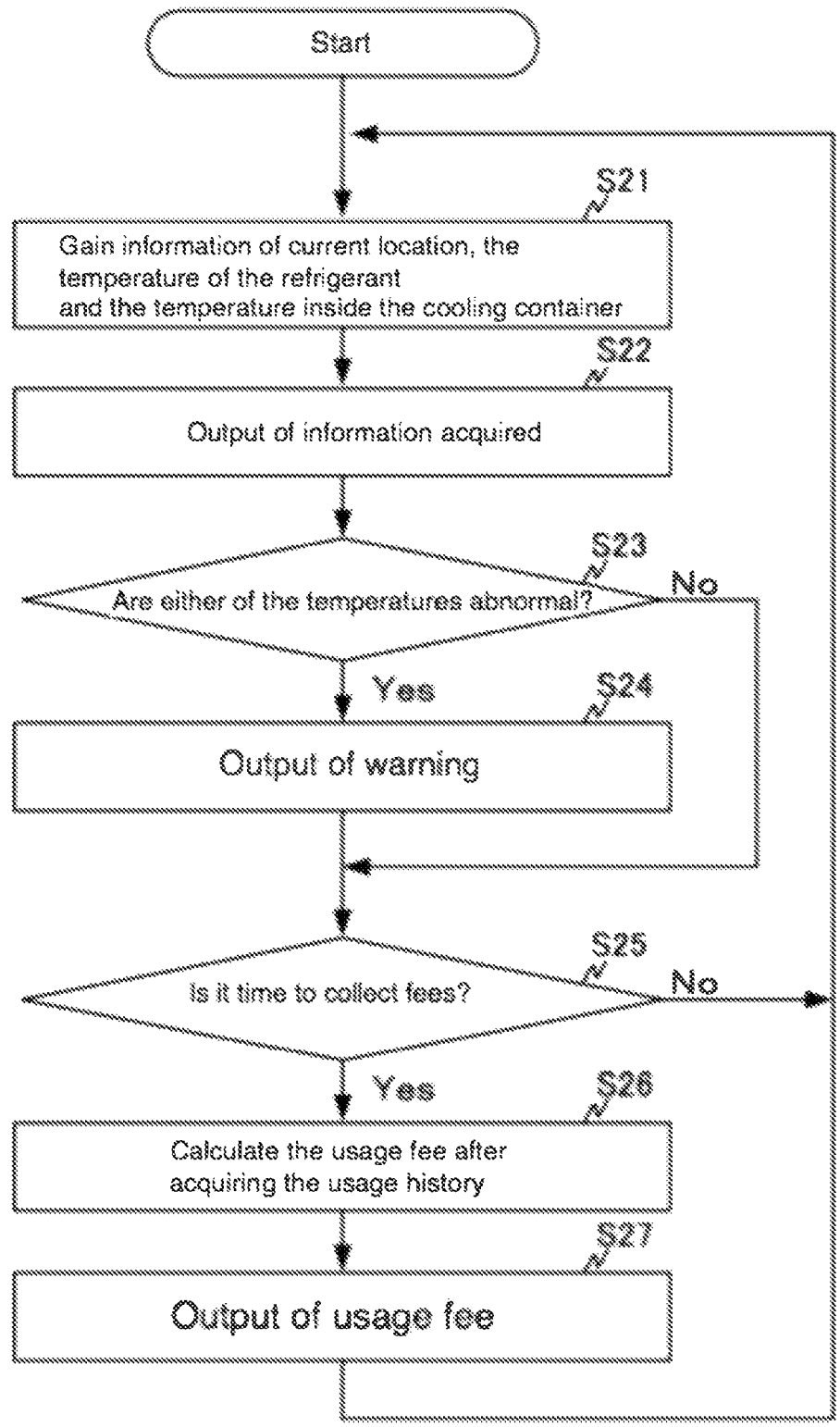
FIG. 12 illustrates a flowchart of operations, when transporting the container in this invention's second implementation.

When referencing the flowchart from FIG. 12, it is possible to see how terminal 530 acquires information regarding the vehicle 500's current location, the temperature of refrigerant 30 as stored in each of the container(s) 100, as well as the temperatures of the insulating item storage space 20 per container 100 (step S21). The current location of vehicle 500 can be measured via GPS through terminal 530. The temperatures of each of the refrigerant 30 storage space(s) 20 can be acquired through communication through control unit 18 of each container 100.

In the next step, S22, the information acquired in step 21 is transmitted to the user (step 22). This information output is sent from terminal 530 to the management server 600. The display that is connected directly to the management server 600 will show the information. It is also possible for terminal 530 to show the information on the display as well. Thus, users who use either management server 600 or terminal 530 has information in real-time about the current location of vehicle 500, or the temperatures of the insulating items' storage space 20 and refrigerants 30.

Next, terminal 530 will take the information acquired in step 21, and determine whether or not there are any abnormalities with the temperatures of the insulating items storage space 20 or the refrigerant 30 (in step 23). For instance, if the temperature of the insulating items storage space 20 were to be vastly different, from the temperature that is cooling the insulating items stored in the storage space 20, this difference is considered to be abnormal. Or, for instance, should the refrigerants 30 have a much different temperature than anticipated, then it is considered an abnormality.

What this means is that it is possible to determine an abnormality ('no' with regards to step 23), as such that after a long time since refrigerant 30 has been cooled, the insulating items cannot be adequately be refrigerated. When this happens, a signal is sent to the user of the temperature abnormalities in the insulating items storage space 20 and/or the refrigerants 30 (step 24). This output is possible via the same methods as step 22, where management server 600 and terminal 530 can show on display. In this case, it is also an option to have the management server 600 and/or the terminal 530 send an audible warning via speakers. The next step is step 25.

Meanwhile, if the information acquired about the temperatures of the insulating items storage space 20 and refrigerant 30 from step 21 are within the reasonable range, whereas the refrigerants seem to be adequately providing refrigeration, then operations are deemed as functional (this would be a 'yes' with regards to step 23). In this case, no warning signal would be transmitted, so that the system skips over to step 25.

In step 25, the cooling device 300 determines whether or not it is time to calculate the usage fee (step 25). The times for determining the usage fee can be set at once a day, once a week, or even once a month.

If it is not time to calculate the usage fee yet, (a 'no' with regards to step 25), then the system will revert to step 21 and repeat the processes listed above.

If, on the other hand, it is time to calculate the usage fee, terminal 530 would acquire the usage history from control unit 18 and calculate a usage fee for each of the container 100s (step 26). Or, terminal 530 can send the information acquired about the usage history to management server 600, so that the management server 600 can also calculate the usage fee. In this case, it is possible for terminal 530 to simply transmit the usage fee it calculated to management server 600. Usage fees are calculated based on the amount of time that the cooling device 300 was used, which is included in the usage history. This means that a unit price per unit time is predetermined for the cooling device 300, where this unit price is used to calculate the usage fee based on the actual usage time. In such a case, for example, per each cooling device 300, the unit price can be different. By using the cooling device 300 ID that is included in the usage history information, the cooling device used can be picked out, and the usage fee can be calculated depending on the unit price of the cooling device 300.

Next, the usage fee calculated is transmitted as information (step 27). This information output is similar in method to that of steps 22 and 24, where management server 600 or terminal 530 can show the information on the display. Then, the system will revert to step 21 and repeat the steps.

Users who have used cooling device 300 can see the information showed on the display, so that they know exactly how much to pay/charge for the usage fee of cooling device 300 to businesses. Thus, the transportation costs related to container 100 can be easily accessed.

In addition, businesses are able to reference the cooling device 300's functions to know how much to charge a user for using the cooling device 300.

According to the description of this implementation of the invention, it is possible to share information with users in real time about the exact location of container 100 stored in vehicle 500, as well as the temperatures of the insulating items storage space 20 and refrigerant 30. Further, should the temperatures every reach an abnormal temperature, the user can be alerted of such an incident.

In addition, given a specific billing period, it is possible to automatically calculate the usage fee of the cooling device 300, so that the users as well as businesses who installed the cooling device 300 are able to know the usage fee.

<Implementation 3>

The following is a text describing implementation 3 of this invention. This implementation's container 100, pallet 200, cooling device 300 as well as refrigerant 30 are relatively similarly designed and functional as that of implementations 1 and 2. No further explanation on each of said aspects should be required. In the following text, the differences between implementation 3 from that of implementations 1 and 2 will be described in closer detail.

In implementation 3 of this invention, the shape of the pathway for cool air provided to refrigerant 30 via the cooling device 300 looks different, in comparison to the pathway in implementation 1. To be specific, the shape of SP1 is different from that of implementation 1.

By changing this shape, it is possible for the amount of cool air passing through several of fan 14 from SP1 to SP2, to be a more even distribution per fan. In this way, each of the refrigerant 30 placed in SP2 can be evenly cooled and refrigerated, shortening the time it takes for overall refrigeration.

This point is best explained with reference to FIGS. 13 and 14. This implementation's container is referred to as container 101, not container 100.

Figure 13:
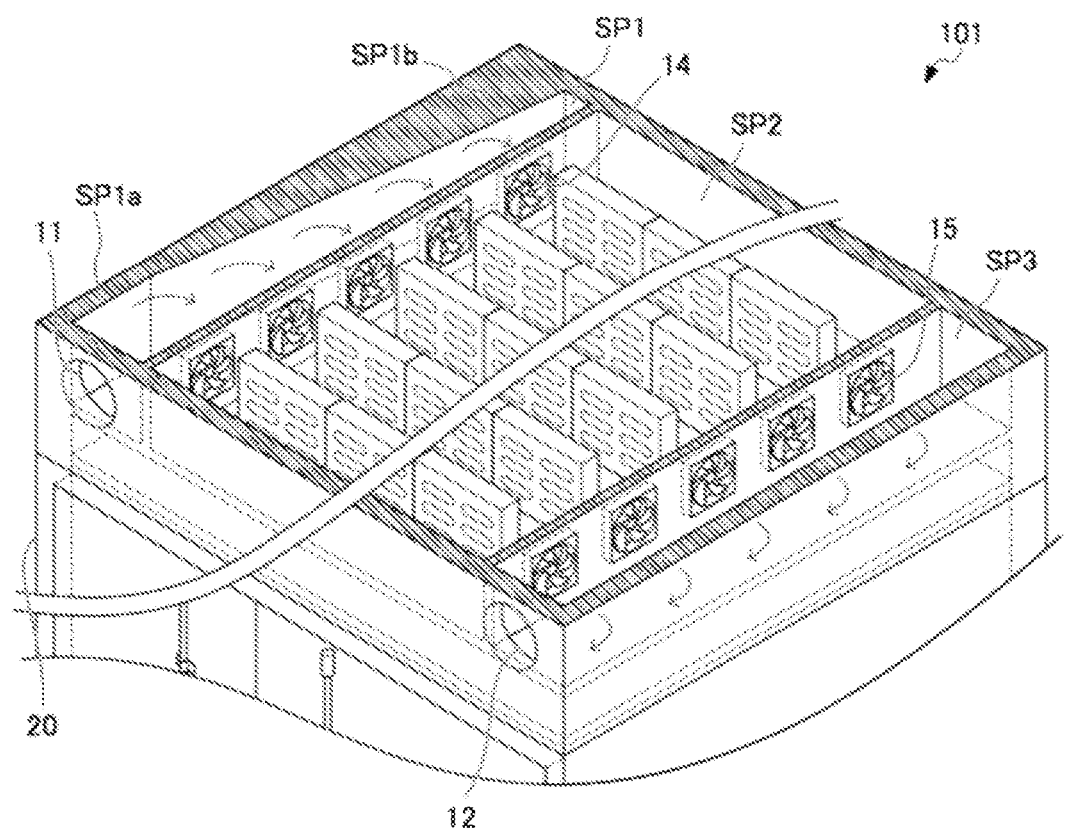
FIG. 13 illustrates an oblique drawing showing the container and fan of the this invention's third implementation.
Figure 14:
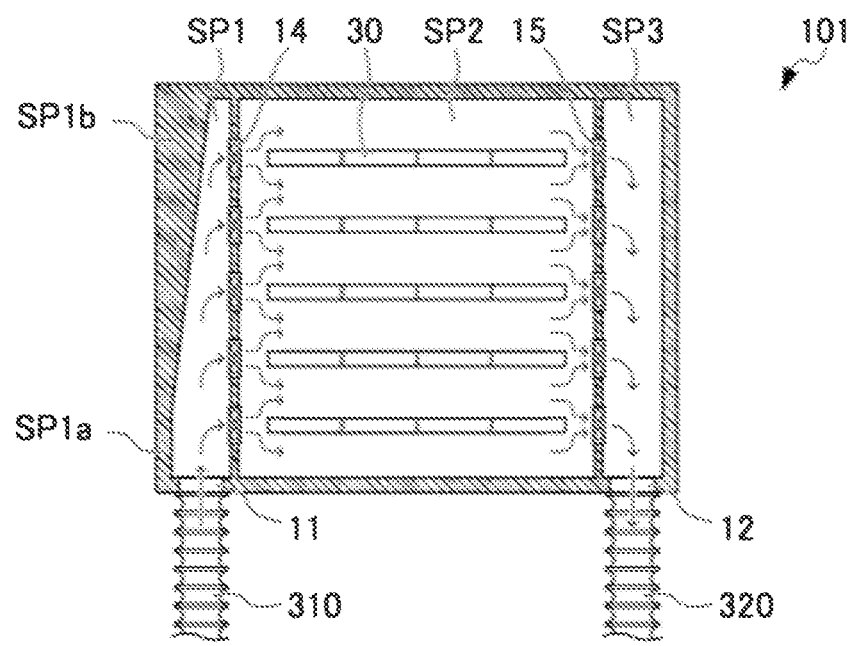
FIG. 14 illustrates a plain view of the third implementation of this invention, showing the container and the cool airflow caused by the fan.

In FIG. 13, viewers can see an oblique drawing of container 101. However, in FIG. 14, viewers can see a planar view of container 101. This means that FIGS. 13 and 14 are counterparts of FIGS. 6 and 7 from implementation 1. With regards to FIGS. 13 and 14, similar to FIGS. 4, 6 and 7, the upper surfaces of SP1, SP2 and SP3 are illustrated as transparent. Furthermore, in FIG. 7, SP2, which makes up the center of container 100, is not seen.

SP1 and SP2 are visible on the left hand side of FIG. 7, where multiple fans 14 are arranged in the material that vertically separates the spaces. As the figure shows, this example shows 5 fans. The number of fans that you place are not limited. In the illustration, there are 5 of fan 14, where only 1 is labeled as fan 14. The functions as well as designs of each of fan 14 are the same as in the first implementation.

However, in this figure, the material that separates SP 1 and SP 2 vertically—with the fan 14 built inside—faces a different surface than that of implementation 1.

Here is an explanation for the previous point made. The cool air provided by 300 is supplied through pipe 310, then guided to SP1 using the suction connector 11 and its output force. At this point, the fan 14 that is close to the suction connector 11 has a stronger rotational force in the fan, due to the strong output force of the pipe 310. Meanwhile, fans that are further away from the suction connector 11 have a weaker rotational force, since the cold air from the pipe 310 must go through the fan 14 that are closer first.

This means that the further away from the suction connector 11, the weaker the rotational force of the fan. In other words, the amount of cold air guided by each of fan 14 into SP2 is less, depending on how far away from the suction connector 11. As mentioned before, should the amount of cool air flowing defer for each fan 14, the refrigerant 30 in SP2 will not be cooled down evenly. Thus, some of refrigerant 30 will cool down slower than others, requiring more time for all of refrigerant 30 to achieve optimal coolness.

Therefore, in this implementation, the distance, between the surface where several of fan 14 are placed, and the opposite surface, can be adjusted. More specifically, by going away from the terminal where the suction connector 11 is placed, on the plane with several of fan 14, the distance can be shortened. This means that by going further in from the suction connector 11, the space can be narrowed down. More specifically, as FIGS. 13 and 14 reflect, with regards to the width of the surface that is opposite that of the surface with several of fan 14, the farther width (SP1$b$ as seen in the figure) must be wider than that of the width of the surface adjacent to the suction connector 11 (Sp1$a$ as seen in the figure).

This design allows for the pressure to increase when going farther in from the suction connector 11, which then makes the amount of cool air directed into SP2 through each of the fan(s) 14 to even out.

In this implementation, by creating a mechanism that evenly distributes the cold air through each of fan 14, refrigerant(s) 30 stored in SP2 also receive cold air evenly, so as to remove the problem of having refrigerants that refrigerate more readily than others.

All this also allows shortening the time it takes for refrigerant(s) 30 to cool, making it more efficient to cool refrigerant 30.

And so, in this text each of the implementations 1, 2 and 3 have been described. It is possible to realize the previously mentioned container 100, container 101, cooling device 300, terminal 530 and management server 600 through hardware, software or a combination of both. Further, the cooling container management methods for each of the previously listed container 100, container 101, cooling device 300, terminal 530 and management server 600 are realized also through hardware, software or a combination of both. In this case, software means a computer reading a program and realizing the desired effect(s).

The program is made up of several types of non-transitory computer readable mediums, so that a computer is able to access it. Non-transitory compute readable mediums include several types of tangible storage mediums. Examples of non-transitory computer readable mediums include a magnetic recording medium (such as a floppy disk, magnetic tape or hard drive disk), magnetic optical recording mediums (such as a magnetic optical disk), CD-ROMs (read-only memory), CD-R, CD-R/W, and semiconductor memory (such as mask ROM, PROM (programmable ROM), EPROM (erasable PROM), flash ROM, RAM (random access memory)). Furthermore, the program is also accessible by a computer through several types of transitory computer readable mediums. Some examples of transitory computer readable mediums include electrical signals, optical signals, and electromagnetic waves. For transitory computer readable mediums, they are able to provide the program to a computer through a wired communication path, such as an electric wire or optical fiber, or through a wireless communication path.

Furthermore, despite how the above mentioned implementation is the preferred embodiment of this invention, the invention is not limited merely to the scope of said implementation. It is entirely possible to utilize the invention to an extent that is not the listed summary, in various modifications.

In short, this invention is widely capable in providing refrigeration options, regardless of the applications of a cooling container or the type of refrigerants used in insulation.

DESCRIPTION OF THE CODE 100, 101 Container
10 Space for the refrigerants
11 Connector for inhalation
12 Connector for emission
13 Opening/Closing part
14 Input fan
15 Output fan
16 Upper drain pan
16-1, 16-2, 16-3 Upper drain pan hole
17 Lower drain pan
17-1, 17-2, 17-3, 17-4 Lower drain pan hole
18 Control unit
19-1, 19-2 Adjusting mechanisms
20 Insulation item storage space
30 Refrigerant
31 RFID Tag
41, 42 Water drops
43 Cooling air
44 Drainage section
200 Pallet
300 Cooling device
310 Supply pipe
320 Recovering pipe
500 Vehicle
510 Passenger room
520 Load-carrying tray
521 Opening and closing handle
530 Terminal
600 Managing server
SP1 Space 1
SP1a, SP1 Space 1 configuration
SP2 Space 2
SP3 Space 3

The invention claimed is:

1. A cooling container to keep insulated items cool by adjusting input and output of cool air inside the cooling container, the cooling container comprising:
a first storage area configured to hold refrigerants used for keeping the insulated items cool;
a second storage area for holding the insulated items;
a first plank arranged parallel to the first storage area; and
a second plank arranged parallel to the first plank and the second storage area, wherein
the first and second planks are perpendicularly arranged above and below a horizontal plane, and configured to be adjusted higher or lower than the horizontal plane,
each of the first and the second planks has a horizontal surface including holes therethrough for allowing the cool air to flow therethrough, and
the holes of the second plank are arranged so that water drops permeating through the holes of the first plank are restrained from dripping in the cooling container.

2. The cooling container of claim 1, further comprising:
a means of measuring temperature of the first and the second storage areas; and
a means of varying distance between the first and second planks based upon a determined variance in temperature of the second storage area from a desired temperature.

3. The cooling container of claim 2, wherein
the first and the second planks touch, so as to cover the holes on the first and the second planks to prevent the cool air from entering the second storage area space.

4. The cooling container of claim 3, further comprising:
a first fan to take the cool air from a cooling device to the first storage area via a supply route; and
a second fan to take the cool air after the refrigerant in the first storage area has been cooled, via a cool air recovery route from the first storage area back to the cooling device.

5. The cooling container of claim 4, wherein the first fan includes a plurality of fans, and
a path for providing the cool air is placed near the horizontal plane.

6. The cooling container of claim 4, further comprising:
a first communication means that takes a temperature measured from the refrigerant; and
a second communication means that takes information acquired from the first communication means and gives instructions on adjustments that need to be made through the cooling device for the refrigerant.

7. The cooling container of claim 6, wherein electric power is supplied from the cooling device for cooling operations.

8. The cooling container of claim 6, further comprising a managing device system, the managing device that receives information from the first and second communication means including location of the cooling container, the temperature of first storage area and the temperature of the second storage area.

9. The cooling container of claim 8, wherein the managing device calculates the temperature of the first storage area via the information of the temperature of the refrigerant.

10. The cooling container of claim 9, wherein the managing device sends the information about the temperatures of the first and the second storage areas to a user upon exceeding the desired temperature.

11. The cooling container of claim 10, wherein
the managing device calculates a rate based on usage of the cooling device, and transmits the rate of a fee to the user.

12. The cooling container of claim 1, further comprising:
a control unit arranged perpendicular to the first and second planks, and placed above and below the first and second planks, the control unit is configured to:
adjust an ascent or descent of the first and second planks,
adjust a distance between surfaces of the first and second planks, and
control the distance in order to control the input of the cool air to the refrigerant before entering the second storage area.

* * * * *